(12) United States Patent
Maltsev et al.

(10) Patent No.: US 7,899,125 B2
(45) Date of Patent: Mar. 1, 2011

(54) METHOD, DEVICE, AND APPARATUS FOR MULTI-STREAM MULTI-BAND TRANSMISSION

(75) Inventors: Alexander A. Maltsev, Nizhny Novgorod (RU); Alexey E. Rubtsov, Nizhny Novgorod (RU); Ali S. Sadri, San Diego, CA (US); Andrey V. Pudeyev, Nizhny Novgorod (RU); Sergey Tiraspolsky, Nizhny Novgorod (RU); Alexey Davydov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 817 days.

(21) Appl. No.: 11/812,283

(22) Filed: Jun. 18, 2007

(65) Prior Publication Data

US 2008/0310526 A1 Dec. 18, 2008

(51) Int. Cl.
H04L 27/28 (2006.01)

(52) U.S. Cl. .......... 375/260; 375/132; 375/259; 375/130; 375/133; 370/206; 370/343; 370/350

(58) Field of Classification Search .......... 375/259, 375/260, 295, 265
See application file for complete search history.

(56) References Cited

U.S. PATENT DOCUMENTS

| | | | | |
|---|---|---|---|---|
| 7,313,190 B2 * | 12/2007 | Balakrishnan et al. | ...... | 375/260 |
| 7,523,382 B2 * | 4/2009 | Kim et al. | ............. | 714/776 |
| 7,583,584 B2 * | 9/2009 | Wang et al. | ............. | 370/206 |
| 2005/0152465 A1 | 7/2005 | Maltsev et al. | | |
| 2005/0232137 A1 * | 10/2005 | Hosur et al. | ............. | 370/208 |
| 2006/0023802 A1 * | 2/2006 | Balakrishnan et al. | ...... | 375/265 |
| 2007/0165729 A1 * | 7/2007 | Ha et al. | ............. | 375/260 |

OTHER PUBLICATIONS

IEEE Standard for Information technology, "Part 15 3: Wireless Medium Access Control (MAC) and Physical Layer (PHY) Specifications for High Rate Wireless Personal Area Networks (WPANs)". 2003.
Rubtsov. Alexey et al "Mutli-Stream Multi-Brand (MSMB) OFDM System for mm Wave WPAN", MG Wireless Standards and Technology, Oct. 1, 2007.
ECMA—368. High Rate Ultra Wideband PHY and MAC Standard, 1st Edition. Dec. 2005.
Anuj Batra et al "Design of a Multiband OFDM System for Realistic UWB Channel Environments", IEEE Transactions on Microwave Theory and Techniques. vol. 52, No. 9, Sep. 2004.

* cited by examiner

*Primary Examiner*—Shuwang Liu
*Assistant Examiner*—Kenneth Lam
(74) *Attorney, Agent, or Firm*—Pearl Cohen Zedek Latzer, LLP (57) ABSTRACT

A transmitter may include a set of stream groups, each including two or more streams producing a set of orthogonal frequency division multiplexed (OFDM) stream-symbols and a coding unit interleaving the stream-symbols into an interleaved signal. An input bit multiplexer may route an input data signal to be divided among each of the streams. An inverse fast Fourier transform unit may operate on a combined signal formed from interleaving the interleaved signals from each stream group. Each stream may include for example a baseband signal processor producing the OFDM stream-symbols.

20 Claims, 6 Drawing Sheets

| Intra-BG TFC Number | TFI/FFI | Band ID (intra-BG) | | | | | |
|---|---|---|---|---|---|---|---|
| 1 | TFI | 1 | 2 | 1 | 3 | 2 | 3 |
| 2 | TFI | 1 | 3 | 1 | 2 | 3 | 2 |
| 3 | TFI | 1 | 1 | 2 | 2 | 3 | 3 |
| 4 | TFI | 1 | 1 | 3 | 3 | 2 | 2 |
| 5 | Reduced TFI | 1 | 2 | 2 | 1 | 1 | 2 |
| 6 | Reduced TFI | 1 | 3 | 3 | 1 | 1 | 3 |
| 7 | Reduced TFI | 2 | 3 | 3 | 2 | 2 | 3 |
| 8 | FFI | 1 | 1 | 1 | 1 | 1 | 1 |
| 9 | FFI | 2 | 2 | 2 | 2 | 2 | 2 |
| 10 | FFI | 3 | 3 | 3 | 3 | 3 | 3 |

FIG 3B

| Inter-BG TFC Number | Band Group ID | | | | | |
|---|---|---|---|---|---|---|
| 1 | I | I | II | II | II | II |
| 2 | I | II | I | II | II | II |
| 3 | I | I | I | I | I | I |
| 4 | II | II | II | II | II | II |

FIG 4A: NAS=6, intra-BG TFC #1, inter-BG TFC#2

FIG 4B: NAS=4, intra-BG TFC #1, inter-BG TFC#2

FIG 4C: NAS=2, intra-BG TFC #1, inter-BG TFC#2

FIG 5B: NAS=2, intra-BG TFC#5, inter-BG TFC #2

FIG 5A: NAS=4, intra-BG TFC#5, inter-BG TFC #2

FIG. 6

METHOD, DEVICE, AND APPARATUS FOR MULTI-STREAM MULTI-BAND TRANSMISSION

BACKGROUND OF THE INVENTION

Draft IEEE Std 802.15.3 (2003) defines the physical (PHY) and medium access control (MAC) layer specifications for high data rate wireless connectivity over short distances among relatively few participants involving little or no infrastructure such as for, e.g., wireless personal area networks (WPANs).

The ECMA-368 Standard (December, 2005) defines the ultra wideband (UWB) physical layer (PHY) for a wireless personal area network, utilizing the unlicensed 3.1-10.6 MHz frequency band at data rates up to 480 Mbps. The standard specifies a MultiBand Orthogonal Frequency Division Modulation (MB-OFDM) scheme for transmitting information using a total of 110 sub-carriers, 100 data carriers and 10 guard carriers, per band.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

It should be understood that the present invention may be used in a variety of applications. Although the present invention is not limited in this respect, the circuits and techniques disclosed herein may be used in many apparatuses such as personal computers, stations of a radio system, wireless communication system, digital communication system, satellite communication system, and the like.

Stations or other wireless or mobile wireless devices intended to be included within the scope of the present invention include, by way of example only, wireless local area network (WLAN) stations, wireless personal area network stations, two-way radio stations, digital system stations, analog system stations, cellular radiotelephone stations, personal digital assistants or personal computers with wireless capabilities, and the like.

Types of WPAN communication systems intended to be within the scope of the present invention may include those described by, although are not limited to those described by, "IEEE Standard for Information technology—Telecommunications and information exchange between systems—Local and metropolitan area networks—Specific requirements Part 15.3: Wireless Medium Access Control (MAC) and Physical Layer (PHY) Specifications for High Rate Wireless Personal Area Networks (WPANs)", 2003 draft of IEEE Standard 802.15.3; and ECMA Standard ECMA-368: "High Rate Ultra Wideband PHY and MAC Standard", December 2005; referred to herein as "ECMA-368" and the like.

Types of WPAN stations intended to be within the scope of the present invention include, although are not limited to, stations for receiving and transmitting spread spectrum signals such as, for example, orthogonal frequency division multiplexing (OFDM).

Devices, systems and methods incorporating aspects of embodiments of the invention are also suitable for for example computer communication network applications, for example, intranet and Internet applications. Embodiments of the invention may be implemented in conjunction with hardware and/or software adapted to interact with a computer communication network, for example, a personal area network (PAN), local area network (LAN), wide area network (WAN), or a global communication network, for example, the Internet.

Embodiments of the invention may provide a method and apparatus for for example multi-stream multi-band OFDM communications. In a wireless communication system, such as for example, a WPAN, it may be desirable to communicate at data rates higher than that presently available according to for example the ECMA-368 standard or other standards, which describes multi-channel transmission of one stream across up to three frequency bands. In contrast, while the present invention is not limited in this respect, embodiments of the present invention may enable transmission using multiple streams across multiple bands, thereby increasing throughput and/or spectral efficiency.

In one embodiment, a transmitter may include a set of stream groups Each stream group may include a set of streams processing a data signal into a set of orthogonal frequency division multiplexed stream-symbols and an intra band group time frequency coding unit interleaving the OFDM stream-symbols from each of the streams into the interleaved signal from the stream group. Each stream may include for example a baseband signal processor for producing OFDM stream-symbols. The transmitter may include an input bit multiplexer for example routing an input data signal to be divided among each of the streams in each of the stream groups. The transmitter may include an inter band group time frequency coding unit interleaving the signal over the all band groups and an inverse fast Fourier transformer unit performing an inverse fast Fourier transform operation on a combined signal formed from an interleaved signal from all stream groups.

Figure 1:
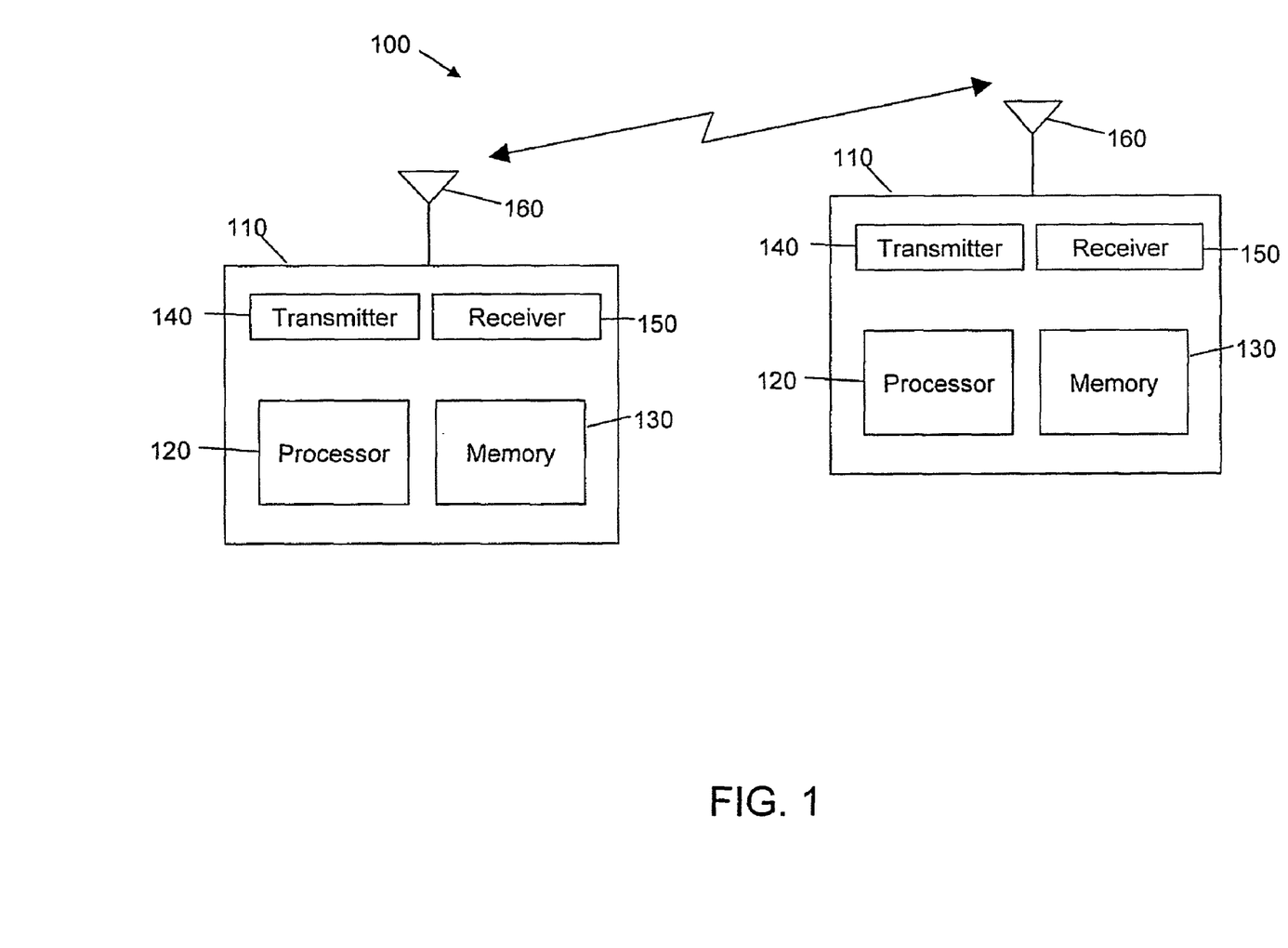
FIG. 1 a schematic illustration of a wireless communication system according to an embodiment of the invention.

Reference is now made to FIG. 1, a wireless communication system in accordance with an embodiment of the present invention. It will be appreciated by those skilled in the art that the simplified components schematically illustrated in FIG. 1 are intended for demonstration purposes only, and that other or additional components may be required for operation of the wireless devices. Those of skill in the art will further note that the connection between components in a wireless device need not necessarily be exactly as depicted in the schematic diagram.

Although the invention is not limited in this respect, wireless communication system 100 may include at least one station 110. Multiple stations 110 may be able communicate with one another via a link such as that for a WPAN. Examples of stations 10 may include, for example, laptop and other personal computers, printers and other peripheral devices, digital cameras, and other devices that may operate in close proximity to each other and may require communications links.

In some embodiments, station 110 may include for example one or more processors 120, one or more memory units 130, one or more transmitters 140, one or more receivers 150, and one or more antennas 160. Station 110 may further include other suitable hardware components and/or software components.

Processor 120 may include, for example, a Central Processing Unit (CPU), a Digital Signal Processor (DSP), a microprocessor, a controller, a chip, a microchip, an Integrated Circuit (IC), or any other suitable multi-purpose or specific processor or controller. Processor 120 may, for example, process data received by station 110, and/or process data intended for transmission by station 110.

Memory unit 130 may include, for example, a Random Access Memory (RAM), a Read Only Memory (ROM), a Dynamic RAM (DRAM), a Synchronous DRAM (SD-RAM), a Flash memory, a volatile memory, a non-volatile memory, a cache memory, a buffer, a short term memory unit, a long term memory unit, or other suitable memory units or storage units Memory unit 130 may, for example, store data received by station 110, and/or store data intended for transmission by station 110 and/or store instructions for carrying out the operation of station 110 including for example embodiments of a method described herein.

Transmitter 140 may include, may include, for example, a wireless Radio Frequency (RF) transmitter able to transmit RF signals, e.g., through antenna 160, and may be capable of transmitting a signal generated by for example a Multi-Stream Multi-Band Orthogonal Frequency Division Modulation (MSMB OFDM) system in accordance with some embodiments of the present invention. Transmitter 140 may be implemented using for example a transmitter, a transceiver, or a transmitter-receiver, or one or more units able to perform separate or integrated functions of transmitting and/or receiving wireless communication signals, blocks, frames, transmission streams, packets, messages and/or data.

Receiver 150 may include, for example, a wireless Radio Frequency (RF) receiver able to receive RF signals, e.g., through antenna 160, and may be capable of receiving a signal generated by for example a Multi-Stream Multi-Band Orthogonal Frequency Division Modulation (MSMB OFDM) system in accordance with some embodiments of the present invention. Receiver 150 may be implemented using for example a receiver, transceiver, or a transmitter-receiver, or one or more units able to perform separate or integrated functions of receiving and/or transmitting/receiving wireless communication signals, blocks, frames, transmission streams, packets, messages and/or data.

Antenna 160 may include an internal and/or external RF antenna, for example, a dipole antenna, a monopole antenna, an omni-directional antenna, an end fed antenna, a circularly polarized antenna, a micro-strip antenna, a diversity antenna, or any other type of antenna suitable for transmitting and/or receiving wireless communication signals, blocks, frames, transmission streams, packets, messages and/or data.

Figure 2:
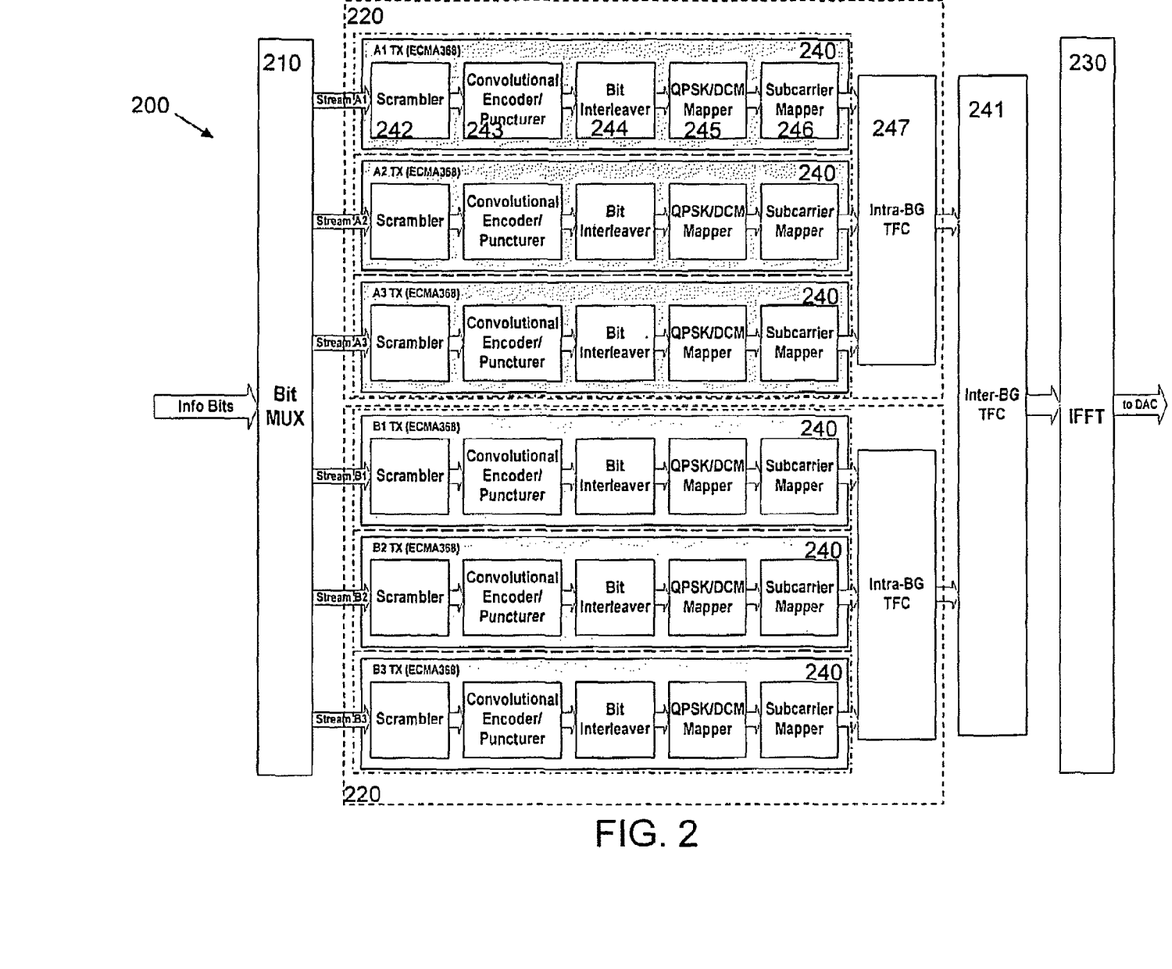
FIG. 2 is a block diagram of a transmitter according to an embodiment of the invention.

FIG. 2 is a block diagram of a transmitter according to one embodiment of the invention. Transmitter 200 or its functionality may be for example included in transmitter 140. Although the invention is not limited in this respect, transmitter 200 may include for example a multiplexer (MUX) such as input bit multiplexer 210, two or more stream groups 220, an inter band group time frequency coding (Inter-BG TFC) unit 241, and an inverse fast Fourier transformer (IFFT) unit 230. Although the invention is not limited in this respect, each stream group 220 may include for example one or more streams 240 and an intra band group time frequency coding (Intra-BG TFC) unit 247.

Each stream 240 may include for example a scrambler 242, a convolutional encoder 243, bit interleaver 244, modulation mapper 245, and sub-carrier mapper 246. It will be appreciated by those skilled in the art that the simplified components schematically illustrated in FIG. 2 are intended for demonstration purposes only, and that other or different components may be included in transmitter 200. Furthermore, one or more of the functional elements in FIG. 2 may be combined or separated into one or more units able to perform separately together functions of the units shown in the embodiment of FIG. 2. Other or additional components may be included.

Although the invention is not limited in this respect, input multiplexer 210 may receive an input data signal that may be for example a bit stream of digital information, and selectively route the signal to be divided among one or more streams 240 of one or more stream groups 220. Each stream group 220 may include a number of streams 240. In embodiments that operate in accordance with ECMA-368 for the baseband processing in each stream 240, the upper limit for the number of streams in each stream group 220 may be for example three. Alternatively, the upper limit for the number of streams may other than three or may be increased beyond three by for example changing the operating parameters of the processing units in stream 240.

Combining up to three streams 240 into a number of stream groups 220 may allow for ultra wideband (UWB) transmission of data at throughputs in excess of those specified in for example ECMA-368. Other numbers of streams may be combined. By operating a number of baseband processing streams in parallel, a higher speed throughput may be achieved with slower encoders than would be possible for a single stream system. Furthermore, transmitter 200 may be operated in for example a full loading mode or a partial loading mode. In a full loading mode, all streams 220 of transmitter 200 may operate at full capacity, possibly improving spectral efficiency. For example, in one embodiment of the present invention up to 3.5 Gbps may be transmitted within 2 GHz of system bandwidth using six streams 240, although the invention is not limited in this respect. In a partial loading mode, a smaller number of streams 240 may be active, or another number may be used. Operating transmitter 200 in a partial loading mode may improve range performance and may allow for flexible adjustment of operating parameters to accommodate interference from the operating environment, although some embodiments of the invention may include other or different advantages.

Baseband signal processing for the divided data signal in each stream 240 may be preformed in accordance with some or all of the principles of the physical (PHY) layer as specified in ECMA-368 to produce an OFDM signal and may include scrambler 242, convolutional encoder 243, bit interleaver 244, modulation mapper 245, and subcarrier mapper 246. These units may also be collectively referred to as a stream baseband signal processor.

In some embodiments, a total of, for example, 110 sub-carriers, of which 100 may be data carriers and 10 may be guard carriers, may be used per stream to transmit data. Other numbers of sub-carriers and combinations of data carriers and guard carriers may also be used without departing from the scope of the invention. Additionally, the use of a number of pilot sub carriers such as, e.g., 12 may allow for coherent detection. Other or different benefits may be found in different embodiments. Input bit multiplexer 210 may receive a digital data stream and may route the data stream to one or more streams 240. In each stream 240, the output of input bit multiplexer 210 may be fed into scrambler 242. Scrambler 242 may scramble the data bits for input to convolutional encoder 243. Although the invention is not limited in this respect, convolutional encoder 243 may encode the data bits using a punctured convolutional encoding technique with a forward error correction (FEC) rate of for example ⅓, ½, ⅝, and ¾. Other encoding techniques and other FEC rates may also be used.

From convolutional encoder 243, the encoded bits may be passed to bit interleaver 244 which may interleave the bits. Although the invention is not limited in this respect, in some embodiments there may be for example three distinct stages to the bit interleaving operation: symbol interleaving, tone interleaving, and cyclic shifting. Frequency domain spreading and time domain spreading may also be used to vary the data rates. Other stages or processes, or other numbers of stages may be used. Bit interleaver 244 may send the signal to modulation mapper 245. In some embodiments, modulation mapper 245 may employ quadrature phase shift keying (QPSK) and dual carrier modulation (DCM) for constellation mapping. Alternatively, higher order modulation schemes, such as for example 16 QAM (quadrature amplitude modulation), may also be used. The output of modulation mapper 245 may be mapped onto sub-carriers by sub-carrier mapper 246.

The output of sub-carrier mapper 246 may be for example a vector of complex symbols for transmitting on a portion of the sub-carriers, referred to herein as OFDM stream-symbols. These stream-symbols may be spread using time-frequency codes (TFC). In some embodiments, two types of TFCs may be used: one where the stream-symbols are interleaved over the number of bands within a given band group (BG), referred to herein as intra-BG TFC, and one where the stream-symbols assigned by intra-BG to a specific band are interleaved over the number of band groups, referred to herein as inter-BG TFC. Other types or numbers of TFCs may be used. For example in a transmitter 200 with six streams in six bands with three bands per band group, the stream-symbols may be interleaved over three bands in each band group using an intra-BG TFC unit 247 and interleaved over the two band groups using inter-BG TFC unit 241.

Figure 3A:
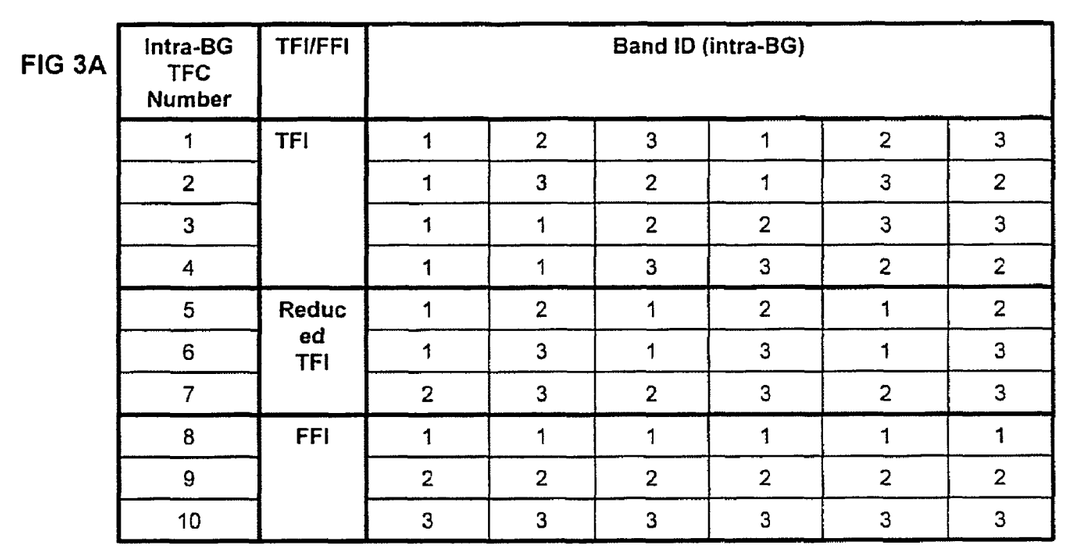
FIG. 3 is a set of tables of time frequency code variants in accordance with an embodiment of the invention

FIG. 3A is a table which includes an example of a set of ten intra-BG TFC variants according to an embodiment of the present invention. For each intra-BG TFC variant, the table shows the corresponding band indexes (within the given BG) on which stream-symbols from the first active stream (within the given stream group) should be mapped. The intra-BG TFCs for second and third streams may be obtained by for example applying specific cyclic shifts. Other sets of intra-BG TFCs and other parameters may be used.

Figure 3B:
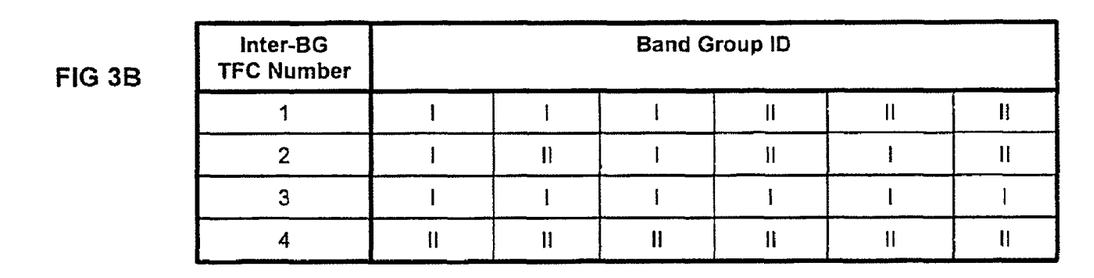

Reference is now made to FIG. 3B which is a table showing an example of a set of four inter-BG TFC variants according to an embodiment of the present invention. For each inter-BG TFC variant, the table shows the numbers of the band groups on which stream-symbols from the first stream group may be mapped. Stream-symbols from the second stream group may be mapped to the alternate band group. Other sets of inter-BG TFCs may be used.

Figure 4A:
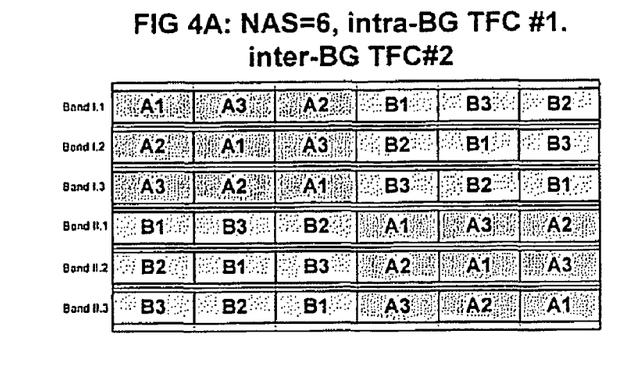
FIG. 4 is a representative illustration of a channel pattern according to an embodiment of the invention.
Figure 4B:
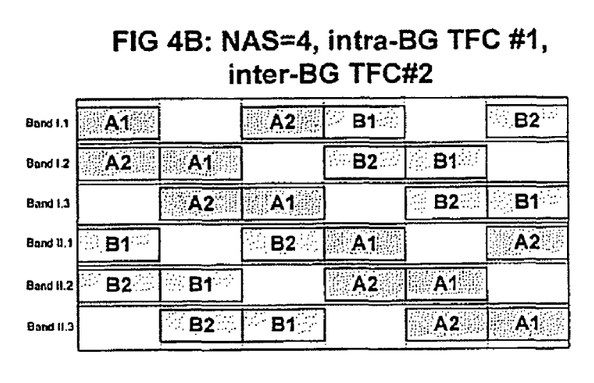
Figure 4C:
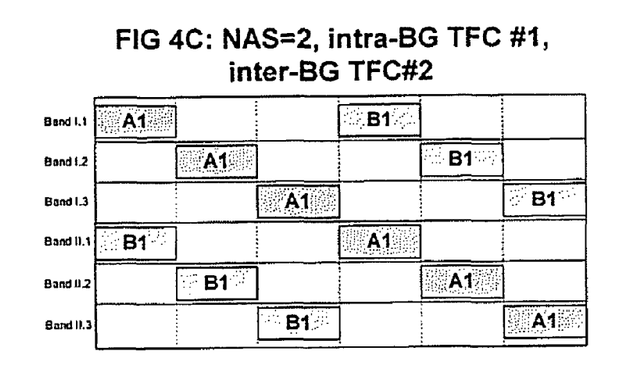

Reference is now made to FIG. 4 which is an example of a channel pattern using TFCs according to an embodiment of the present invention. Each channel pattern may correspond to the given intra-BG TFC, inter-BG TFC and set of active streams. In the illustrative embodiment the intra-BG TFC is 1 and the inter-BG TFC is 1, while the number of active streams is six, four, and two for FIG. 4A, FIG. 4B, and FIG. 4C respectively.

Figure 5A:
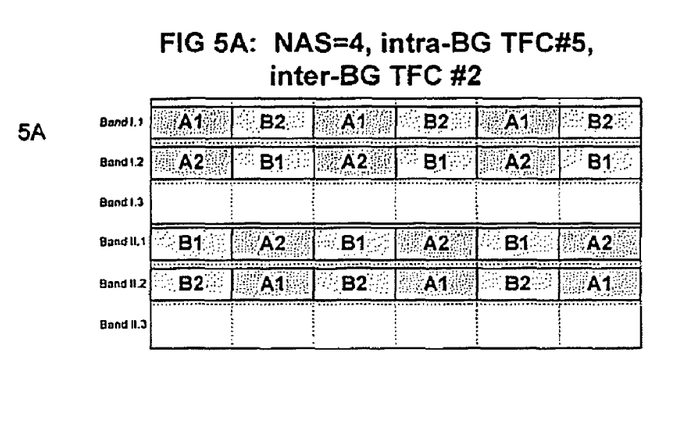
FIG. 5 is a representative illustration of a channel pattern according to an embodiment of the invention.
Figure 5B:
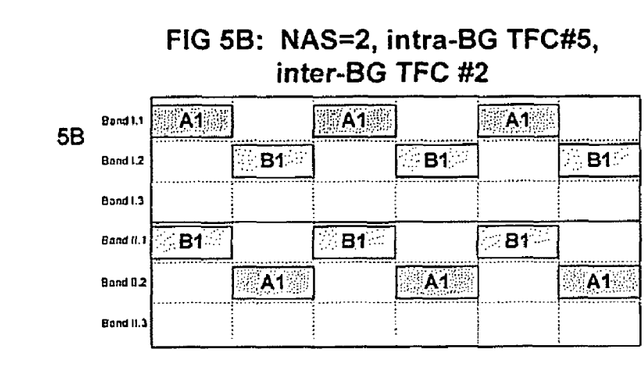

Similarly, FIG. 5 is an example of a channel pattern for which the intra-BG TFC is 5 and the inter-BG TFC is 2, while the number of active streams is 4 and 2 for FIG. 5A and FIG. 5B respectively. The channel patterns shown in these figures indicate that using intra-BG TFC#1-4 with inter-BG TFC#1-2 may provide a maximal value of band diversity ($D_B$), e.g. $D_B$=6, where band diversity as used herein is the number of bands used for one stream-symbol transmission. Furthermore, using intra-BG TFC#5-7 with inter-BG TFC#1-2 may provide a band diversity $D_B$=4. Using inter-BG TFC#3-4 decreases twice the band diversity. Other channel patterns than those in FIG. 4 and FIG. 5 may be used.

Referring back to FIG. 2, although the invention is not limited in this respect, the formed set of interleaved stream-symbols from each stream group may be passed to IFFT unit 230 to be combined into one signal and to be converted into samples in the time domain. IFFT unit 230 may perform an IFFT operation on the combined signal as is known in the art producing an MSMB OFDM signal. In one embodiment having up to six streams in six bands the fast Fourier transform (FFT) size may be 768. In another embodiment, a 1024 point IFFT may be used to transmit up to eight streams in eight bands in, for example, two stream groups with four streams per group. Alternatively, in still other embodiments a 128 point IFFT unit may be used for each stream with subsequent transfer of stream time domain samples to the appropriate band by multiplying on the corresponding sinusoid Using several IFFT blocks, e.g. 6, of a smaller dimension, e.g. 128, may reduce the complexity of IFFT unit 230. For smaller IFFT blocks, the time domain samples of each stream may be multiplied on the corresponding digital sinusoid to shift the spectrum of the stream signal to die appropriate band of the system bandwidth. Subsequently, the multiplied time domain samples from all streams may be combined or summed. Other or different dimensions may be used.

The time-domain OFDM symbols may be formed by adding a guard interval which may be for example a sample cyclic prefix or a zero padding suffix. In one embodiment, a ¼ length of the IFFT period may be used as the guard interval. In other embodiments the guard interval length may be a lower number, such as for example, ⅛ or ​1/16 of the IFFT period. Other or different lengths may be used.

Each stream may employ ten or approximately ten guard sub-carriers. Although the invention is not limited in this respect, these sub-carriers may be arranged with five or approximately five sub-carriers on each of the occupied frequency band for a give stream. Other arrangements may be used. The ECMA-368 standard may allow individual implementations to exploit these guard sub-carriers for various purposes. Although not limited in this respect, embodiments of the present invention may use these sub-carriers for three purposes. Combining guard sub-carriers with corresponding neighbor data sub-carriers on the receive side in an additional frequency-domain spreading scheme, overall performance may be improved by, for example, 0.5 dB If a number of sub-carriers, e.g. up to ten, transmitted from one station 110 may be identified as weak at another station 110 due, for example, to fading or narrow-band interferers, and the frequency locations are known, then the corresponding symbols may be replicated on the guard sub-carriers, thereby patching these weak sub-carriers. In one embodiment, a transmitter or method may replicate a weak data sub-carrier on a guard carrier. Additionally, guard sub-carriers may also be used in various peak-to-average power ratio reduction schemes.

According to some embodiments of the invention, transmitter 200 may operate as an MSMB system in several advanced modes. One such mode may be for system initialization, during which transmitter 200 may operate in a partial loading mode where a subset of the total number of streams, such as one or two, may be active streams. Operating in this mode may increase the range of transmitter 200. Other or different benefits may be achieved. Alternatively, transmitter 200 may be configured to utilize an adaptive selection of channel patterns. For some instances in which channel state information (CSI) may be known, transmitter 200 may adaptively select rates and power values for current packet transmission to improve throughput and/or range performance. Alternatively, transmitter 200 may be configured to utilize an adaptive bit and power loading scheme. For some instances in which the CSI may be known, transmitter 200 may adaptively select rates and power values for current packet transmission to improve throughput and/or range performance. In a further alternative, transmitter 200 may operate in an adaptive stream loading (ASL) mode. For some instances for which the CSI may be known, transmitter 200 may adaptively select a set of active streams and select a modulation and coding scheme for each stream based on the CSI. Operating in this mode may increase throughput with respect to a fixed packet error ratio level. Other or different benefits may be achieved.

Figure 6:
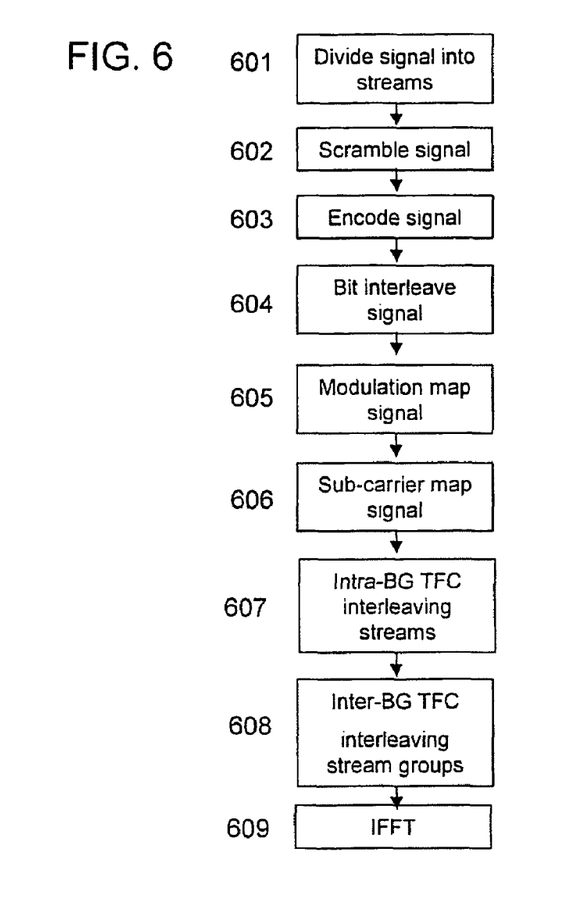
FIG. 6 is a flowchart of a method for transmitting a signal according to an embodiment of the invention.

FIG. 6 is a flowchart of a method of transmitting an MSMB OFDM signal in accordance with some embodiments of the invention. Embodiments of the method may be used by, or may be implemented by, for example, system 100 of FIG. 1, by one or in more of stations 110 of FIG. 1 or by other suitable wireless communication devices, stations, systems and/or networks.

As indicated at box 601, a signal may be divided or selectively routed. The signal may be for example a bit stream of digital information to be divided among one or more streams of one or more stream groups for baseband signal processing for producing OFDM stream-symbols.

The signal may be scrambled (box 602) in for example baseband signal processing operations. The signal may be encoded (box 603), bit interleaved (box 604), modulation mapped (box 605), and sub-carrier mapped (box 606). Alternatively, these operations may be functionally combined or separated as is known in the art.

As indicated in box 607, the OFDM stream-symbols from each respective stream in each respective stream group may be intra-BG TFC interleaved. As indicated in box 608, the interleaved OFDM stream-symbols may be inter-BG TFC interleaved to produce a combined signal from all streams. As indicated in box 609, an IFFT operation may be performed on the combined signal thereby converting the signal in the time domain as an MSMB OFDM signal.

Other operations or series of operations may be used.

While the invention has been described with respect to a limited number of embodiments, it will be appreciated that many variations, modifications and other applications of the invention may be made. Embodiments of the present invention may include other apparatuses for performing the operations herein. Such apparatuses may integrate the elements discussed, or may comprise alternative components to carry out the same purpose It will be appreciated by persons skilled in the art that the appended claims are intended to cover all such modifications and changes as fall within the true spirit of the invention.

The invention claimed is:

1. A transmitter comprising:
    an input bit multiplexer to route bits of an input data signal to be divided among a plurality of stream groups;
    wherein each stream group of said plurality of stream groups is processed by a plurality of baseband signal processors in parallel to generate a set of orthogonal frequency division multiplexed (OFDM) stream-symbols;
    a plurality of intra band group time frequency coding units, wherein each of the plurality of intra band group time frequency coding units is operably coupled to outputs of the plurality of baseband signal processors of each stream group, wherein said intra band group time frequency coding unit is able to interleave the set of OFDM stream-symbols from said baseband signal processors of each stream group and to output an interleaved signal;
    an inter band group time frequency coding unit operably coupled to the plurality of stream groups to interleave interleaved signals outputted by the plurality of intra band group time frequency coding units;
    an inverse fast Fourier transform unit to perform an inverse fast Fourier transform operation on a combined signal formed from an interleaved signal from all stream groups, said interleaved signal from each stream group from a set of OFDM stream-symbols from all streams in each respective stream group.

2. The transmitter of claim 1 where a subset of the streams are active.

3. The transmitter of claim 1 configured for adaptive selection of channel patterns.

4. The transmitter of claim 1 configured for adaptive bit and power loading.

5. The transmitter of claim 1 wherein said baseband signal processor is to map approximately 110 sub-carriers per stream to transmit data.

6. The transmitter of claim 5 wherein said approximately 110 sub-carriers comprise approximately 100 data carriers and approximately 10 guard carriers.

7. The transmitter of claim 1 configured to replicate a weak data sub-carrier on a guard carrier.

8. The transmitter of claim 1 comprising three streams per stream group and comprising two stream groups.

9. A wireless communication device comprising:
a dipole antenna operably coupled to a transmitter to transmit a signal;
said transmitter including at least an input bit multiplexer to route bits of an input data signal to be divided among a plurality of stream groups;
wherein each stream group of said plurality of stream groups is processed by a plurality of baseband signal processors in parallel to generate a set of orthogonal frequency division multiplexed (OFDM) stream-symbols;
a plurality of intra band group time frequency coding units, wherein each of the plurality of intra band group time frequency coding units is operably coupled to outputs of the plurality of baseband signal processors of each stream group, wherein said intra band group time frequency coding unit is able to interleave the set of OFDM stream-symbols from said baseband signal processors of each stream group and to output an interleaved signal;
an inter band group time frequency coding unit operably coupled to the plurality of stream groups to interleave interleaved signals outputted by the plurality of intra band group time frequency coding units;
an inverse fast Fourier transform unit to perform an inverse fast Fourier transform operation on a combined signal formed from an interleaved signal from all stream groups, said interleaved signal from each stream group from a set of OFDM stream-symbols from all streams in each respective stream group.

10. The wireless communication device of claim 9 where a subset of the streams are active.

11. The wireless communication device of claim 9 configured for adaptive selection of channel patterns.

12. The wireless communication device of claim 9 configured for adaptive bit and power loading.

13. The wireless communication device of claim 9 configured for mapping approximately 110 sub-carriers per stream, wherein approximately 100 sub-carriers are data carriers and approximately 10 sub-carriers are guard carriers.

14. The wireless communication device of claim 9 configured to replicate a weak data sub-carrier on a guard carrier.

15. The wireless communication device of claim 9 comprising three streams per stream group and having two stream groups.

16. A method of transmitting a Multi-Stream Multi-Band Orthogonal Frequency Division Modulation (MSMB OFDM) signal comprising:
routing an input data signal to be divided among a plurality of streams in each of a plurality of stream groups;
processing the divided signal by a plurality of baseband signal processors in each of the plurality of stream groups, to produce orthogonal frequency division multiplexed (OFDM) stream-symbols in each of the plurality of streams in parallel;
interleaving the OFDM stream-symbols, for each stream group, to produce a combined interleaved stream-symbol from the plurality of stream groups;
interleaving and combining the combined interleaved stream-symbols of the plurality of stream groups to produce a combined signal; and
performing an inverse fast Fourier transform on the combined signal to produce said MSMB OFDM signal.

17. The method of claim 16 wherein a subset of the streams are active.

18. The method of claim 16 comprising adaptively selecting channel patterns.

19. The method of claim 16 comprising adaptively bit loading and power loading.

20. The method of claim 16 wherein said baseband signal processing comprises mapping approximately 110 sub-carriers per stream, said 110 sub-carriers comprising approximately 100 data carriers and approximately 10 guard carriers.

* * * * *